July 12, 1932.  G. KALENOFF  1,867,509
AIR CUT-OFF FOR AUTOMOBILE RADIATORS
Filed Dec. 26, 1930
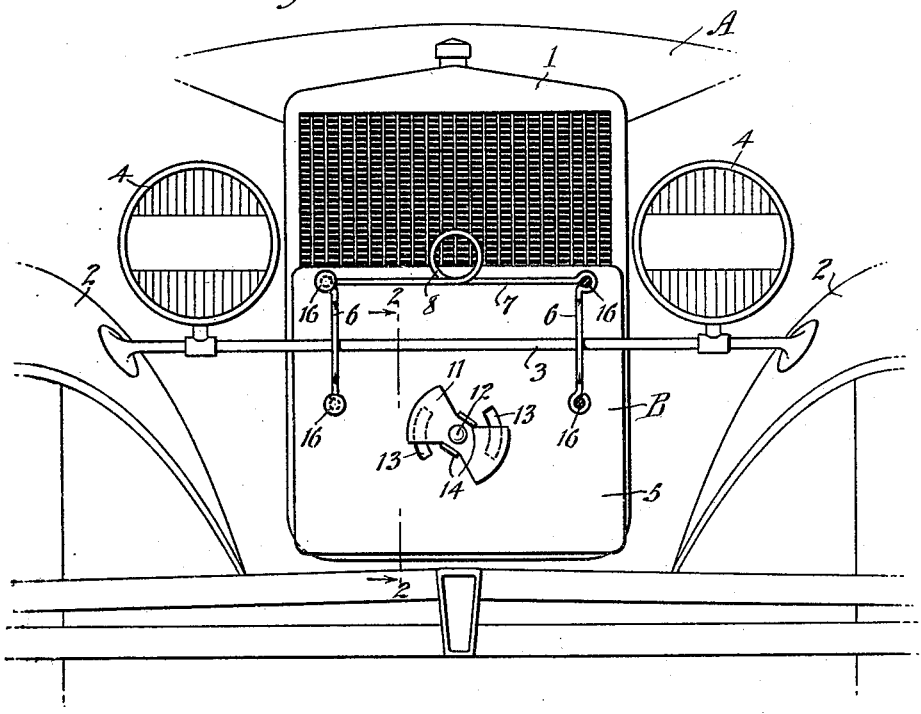
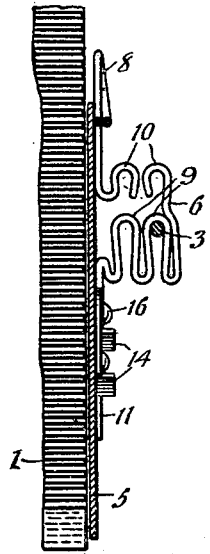
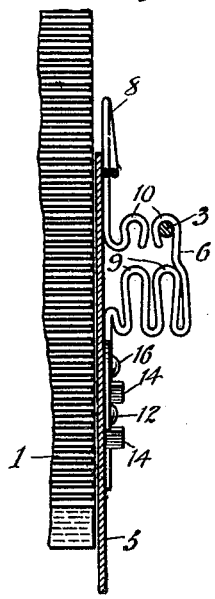
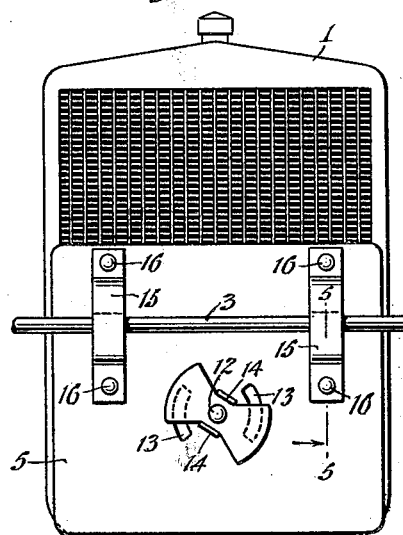
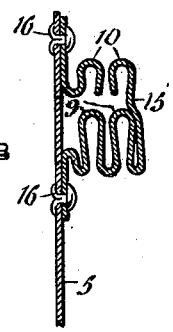
WITNESSES
INVENTOR
Godel Kalenoff
BY
ATTORNEY Patented July 12, 1932

1,867,509

UNITED STATES PATENT OFFICE

GODEL KALENOFF, OF NEW YORK, N. Y.

AIR CUTOFF FOR AUTOMOBILE RADIATORS

Application filed December 26, 1930. Serial No. 504,952.

This invention relates to air cut-offs for automobile radiators, an object of the invention being to provide a device of this character which is adapted to engage the headlight rod of an automobile and hold the plate against the lower portion of the front of the automobile radiator so as to cut off a portion of the air from the radiator.

Devices of this kind are used in cold weather to prevent over-chilling of the water or circulating medium in the radiator, and it is the purpose of my invention to enable the owner of the car to cut off as much of the air circulation or control such circulation to suit temperature conditions.

A further object of my invention is to provide a device of this character which is capable of adjustment so as to fit any standard make of car, and to insure the plate being snugly held against the front of the radiator to prevent rattling or displacement in use.

A further object of my invention is to provide a device of this character which can be made as expensive or as cheap as desired, so that devices of this character can be placed on the market either in their entirety or in separate parts capable of assembly by the user.

With these and other objects in view, the invention consists in certain novel features of construction and combinations and arrangements of parts, all of which will be more fully hereinafter described and pointed out in the claims.

In the accompanying drawing,—

Figure 1 is a more or less diagrammatic view in front elevation of an automobile showing my improved device in operative position on the headlight rod of the automobile;

Figure 2 is an enlarged fragmentary view in vertical section on the line 2—2 of Figure 1;

Figure 3 is a view similar to Figure 2 showing the device in a different position of adjustment on the headlight rod;

Figure 4 is a view in front elevation illustrating a modification; and

Figure 5 is an enlarged detail view in vertical section on the line 5—5 of Figure 4.

The reference character A is used to illustrate an automobile, the several parts thereof having particularly to do with my invention, being given independent reference characters as follows:

1 represents the radiator of an automobile, 2—2 the front wheel fenders and 3 the ordinary rod secured to the fenders and providing support or mounting for the headlights 4—4. The rod 3 in the drawings is illustrated as a straight rod, but in some makes of cars this rod is curved or otherwise shaped, and it is to be distinctly understood that my invention is applicable for use on any shape of rod.

The reference character B is used to indicate generally my improved air cut-off device, separate or independent reference characters being employed to indicate the several parts or elements of my improved cut-off device B.

My improved cut-off device B includes a plate 5 which may be of metal, wood, cardboard or other suitable material, and may be of any size and shape desired, but is especially adapted for cutting off or closing the lower portion of the front of the radiator 1.

On the front of the plate 5 a pair of rod-engaging bracket members 6—6 are secured. These bracket members 6 may be composed of wire, as indicated in Figures 1, 2 and 3 of the drawing, and they may have as an integral or fixed part thereof an upper cross member 7 with an eye or loop 8 therein which constitutes a handle for manually supporting the device.

These members 6—6 each comprise a plurality of loops 9 arranged in longitudinal series for the reception in any of them of the headlight supporting rod 3 so as to position the plate 5 with proper relation to the radiator and the rod 3 to insure a proper positioning of the plate against the radiator. The members 6 also include a series of loops or hook-members 10 arranged in longitudinal series above the loops 9, so that these hook-members 10 may also be utilized to engage the rod 3 and support the plate 5 in a position lower than said plate is supported when the rod 3 is located in one of the loops 9.

This arrangement permits the plate 5 to be supported at its maximum height or a position lower than the maximum height, thus cutting off a variable portion of the radiator in accordance with weather conditions. Furthermore, a plurality of loops and hooks permit an adjustment of the plate relative to the radiator, and I would have it understood that while these loops and hooks have a somewhat fixed relationship they are capable of bending so as to exactly hold the plate as may be desired in accordance with the particular spacing of the rod and radiator on the different makes of cars.

As a further means for controlling or regulating the admission of air to the radiator, I provide a damper 11 which is of general butterfly shape pivotally mounted at its center, as shown at 12, and adapted to cover or uncover slots or openings 13 in the plate 5. This damper may have upstanding fingers 14 to facilitate the movement of the damper.

In the modification illustrated in Figures 4 and 5 of the drawing rod-engaging members 15, corresponding to the rod-engaging members 6 of the form shown in Figures 1, 2 and 3 of the drawing, are of sheet metal, that is, they are of strips of metal or other suitable material of any desired width, but they are shaped in side elevation or vertical section in the same manner as are the members 6, and I have given like reference characters to the hooks and loops of the members 15 as were given to members 6.

As above stated, the members 6 or 15 may be secured to the plate 5 in any desired manner. Where an extremely cheap device is desired I may employ split rivets 16, as shown in Figures 4 and 5, which can be projected through perforated portions of the members 15 and through the plate 5 to secure the parts in proper assembly. It is to be understood that it is well within the scope of my invention to manufacture and sell the rod-engaging members as a separate unit from the plate 5, so that the user of the device may purchase the rod-engaging members and the plate and assemble the parts himself, thus greatly reducing the cost to him. The plate 5 may constitute an ordinary piece of cardboard in the cheapest form of my invention, or in the more expensive forms of my invention this plate may be of metal or wood, and be ornamented in any way desired to suit the taste of the trade.

By reason of the fact that my improved device can be adjusted and regulated to suit the conditions of temperature, the device can be allowed to remain on the automobile and shifted vertically, or the damper may be opened and closed, but it is not necessary to completely remove the device and replace it. It can remain on the car all winter and be always in convenient operative position.

It is also well within the scope of my invention to make the plate 5 more or less flexible or foldable so that it can be stored in a relatively small space when removed, and by reason of the construction of the device it can be utilized on any make of car without altering or disfiguring the car in any way.

While I have illustrated what I believe to be the preferred embodiment of my invention, it is to be distinctly understood that various slight changes may be made with regard to the form and arrangement of parts without departing from the invention, and hence I do not limit myself to the precise details set forth but consider myself at liberty to make such changes and alterations as fairly fall within the spirit and scope of the claims.

What I claim is:

1. An air cut-off device of the character described, comprising a plate of suitable material, and bracket members secured to the plate and adapted to removably engage the headlight supporting rod of an automobile, said brackets each comprising two horizontal series of rod-engaging members, the lower members constituting loops and the upper members constituting hooks whereby the plate may be supported at different horizontal and vertical adjustments relative to the rod.

2. An air cut-off device of the character described comprising a plate of suitable material, and bracket members secured to the plate and adapted to removably engage the headlight supporting rod of an automobile, said brackets composed of bendable material and comprising a lower series of rod-engaging loops and an upper series of rod-engaging hooks.

3. An air cut-off device of the character described, comprising a plate of suitable material, and bracket members secured to the plate and adapted to removably engage the headlight supporting rod of an automobile, said brackets each comprising two horizontal vertically spaced series of rod-engaging members whereby the plate may be supported at different horizontal and vertical adjustments relative to the rod.

GODEL KALENOFF.